United States Patent [19]

Meek et al.

[11] 4,086,813
[45] May 2, 1978

[54] MICROWAVE OVEN FOOD TEMPERATURE SENSING PROBE ASSEMBLY INCLUDING A REFLECTOR

[75] Inventors: Flora L. Meek; Richard E. Hornung, both of Louisville, Ky.

[73] Assignee: General Electric Company, Louisville, Ky.

[21] Appl. No.: 643,092

[22] Filed: Dec. 22, 1975

[51] Int. Cl.² ............................................. G01K 1/08
[52] U.S. Cl. .............................. 73/352; 219/10.55 F; 99/342
[58] Field of Search ............... 73/339 R, 352, 362 AR; 99/342, 421 TP; 219/10.55 F, 10.55 M, 10.55 R; 250/505

[56] References Cited

U.S. PATENT DOCUMENTS

| 2,607,872 | 8/1952 | Enabnit | 73/352 X |
| 2,813,185 | 11/1957 | Smith | 219/10.55 F |
| 3,265,780 | 8/1966 | Long | 219/10.55 F X |
| 3,431,381 | 3/1969 | Anderson | 219/10.55 F |
| 3,815,113 | 6/1974 | Welch | 73/352 X |
| 3,975,720 | 8/1976 | Chen et al. | 340/228 R |

OTHER PUBLICATIONS

*Hotpoint Countertop Microwave Oven Cookbook;* published 6/1974 as Publ # 39–4180; General Electric Part # 862A 136P1; pp. 97, 104–107.

*Primary Examiner*—Richard C. Queisser
*Assistant Examiner*—John S. Appleman
*Attorney, Agent, or Firm*—Steven C. Schnedler; Francis H. Boos

[57] ABSTRACT

A food temperature-sensing probe assembly for monitoring the internal temperature of food while it is being cooked in a microwave oven includes a disc-like reflector either slidably or fixedly mounted on the probe housing adjacent to, but spaced from, the food. The reflector serves to prevent overcooking of the food in a region immediately adjacent the probe.

8 Claims, 5 Drawing Figures

MICROWAVE OVEN FOOD TEMPERATURE SENSING PROBE ASSEMBLY INCLUDING A REFLECTOR

BACKGROUND OF THE INVENTION

1. Field of the Invention

The present invention relates to a food temperature sensing probe assembly for use in a microwave oven. More particularly, the invention relates to such a probe assembly which prevents overcooking of the food in a region immediately adjacent the probe.

2. Description of the Prior Art

Electric thermometer probes which monitor the internal temperature of the food while it is being cooked have been developed for use in microwave ovens. Examples of such probes, adapted to use in microwave ovens, are disclosed and claimed in copending application Ser. No. 616,049, filed Sept. 23, 1975 by David Y. Chen and Louis H. Fitzmayer, now U.S. Pat. No. 3,975,720, issued Aug. 17, 1976; and in copending application Ser. No. 616,050, filed Sept. 23, 1975 by Louis H. Fitzmayer, now U.S. Pat. No. 3,974,696, issued Aug. 17, 1976; each entitled "Food Thermometer for Microwave Oven," and assigned to the same assignee as the present invention. Such probes comprise a needle-like probe adapted to be driven into the food and a temperature-sensing element, such as a thermistor, positioned internally of the probe housing near the distal end thereof. A flexible shielded cable connects the thermistor to circuitry which is responsive to thermally induced changes in its resistance. The cable shield is electrically connected at one end to the probe housing and at the other end to a wall of the oven cooking cavity. In the embodiments disclosed in the above-mentioned Chen and Fitzmayer U.S. Pat. No. 3,975,720, the total effective electrical length of the probe and the cable, measured along the cable and probe from the cooking cavity wall to the distal end of the probe, is selected to be approximately equal to $n\lambda/2$, where $n$ is any integer and $\lambda$ is the wavelength of the microwaves being used to cook the food in the oven. Such a probe and cable assembly may successfully be operated in a microwave oven with minimal direct heating of the probe and cable by the microwave energy.

In general, probes of the above-described type operate satisfactorily and do minimize problems caused by direct heating of the probe and cable by the microwave energy. However, when they are used to monitor the internal temperature of certain foods, including meats and baked potatoes, overcooking of the food in the region immediately adjacent the probe sometimes occurs. The affected region generally extends along the length of the probe, but it is cone-shaped, being wider at the surface of the food. This is considered undesirable from the standpoint of appearance of the food after it has been cooked. Further, the temperature sensing probe necessarily responds to the temperature of the food in the region immediately adjacent the probe. When the food in this immediately adjacent region cooks faster than the other regions of the food, there is an indication of doneness before the bulk of the food (all the other regions within the food) is fully cooked to the desired degree of doneness. The condition which results in overcooking of the food in the region immediately adjacent the probe has been termed "feed in" because the cable and probe seemingly pick up microwave energy present within the cooking cavity and feed or direct the energy into the food along the length of the probe.

The above-described "feed in" effect is to be distinguished from a premature indication of doneness due to direct heating of the probe by the microwave energy, one of the problems to which the inventions comprising the subject matter of the above-mentioned U.S. Pat. Nos. 3,975,720 and 3,974,696 are directed. When a "feed in" problem occurs, the probe may be accurately sensing temperature; the temperature of the food which the probe is sensing (immediately surrounding the probe) is simply not the temperature of the food as a whole.

When the above-mentioned "feed in" problem is manifested, overcooking of the food occurs along the length of the probe in a cone-shaped region beginning at the surface where the probe is inserted into the food. The degree of overcooking is not easily predicted in any particular case and appears to be partially dependent upon the particular combination of size of food and particular insertion depth of the probe into the food. Voltage and current distributions are set up along the cable and probe due to the presence of the microwave energy field, and it is believed that these distributions vary somewhat unpredictably under different cooking conditions. In other words, unless conditions such as size and type of food and exact placement of the probe are maintained exactly the same from one cooking operation to the next, seemingly inconsistent results have been found to occur.

By the present invention, there is provided a temperature-sensing probe assembly for monitoring internal temperature of food while it is being cooked in a microwave oven, which probe assembly reliably avoids the above-described "feed in" problem, even when the probe is used to measure the internal temperature of many different types of food and under varying cooking conditions.

SUMMARY OF THE INVENTION

It is therefore an object of the invention to provide a temperature-sensing probe assembly for use in a microwave oven, which assembly reliably prevents overcooking of the food in a region immediately adjacent the probe.

This and other objects are accomplished by the present invention in which there is provided a needle-like probe adapted for insertion into the food to be cooked, a temperature-sensing element being positioned internally of the probe housing near the tip thereof. A flexible shielded cable is provided for connecting the temperature-sensing element to suitable circuitry. The cable shield is electrically connected at one end to the probe housing and is adapted at the other end for connection to a wall of the microwave oven cooking cavity. The probe housing and the cable shield thereby cooperate to form a continuous conductive sheath from the tip of the probe housing to the other end of the cable. In accordance with the invention, an electrically-conductive reflector is mounted on the continuous conductive sheath, preferably along the rigid probe housing portion thereof. The reflector is adapted to be positioned adjacent to, but spaced from, the food to reduce the amount of microwave energy which enters the food in the region immediately adjacent the probe housing. Preferably, the reflector is in the form of a disc of from 1.25 to 1.6 inches in diameter and, in use, is spaced from ⅛ inch to 2½ inches from the surface of the food.

The term "reflector" is used in reference to the structure described herein on the assumed theory of operation that the structure operates to reflect microwave energy propagating along the cable towards the probe (and the food) back away from the probe (and the food) towards the oven wall end of the cable. While the explanation of the operation of the invention herein is believed to be correct, it is realized that other, presently unappreciated, principles of operation may be applicable and that, in such event, the "reflector," as described herein, may not actually be functioning as a reflector in the usual sense of the word. If such is ultimately deemed to be the case, then the term "reflector" is intended, nevertheless, to mean the structure as described herein and its equivalents.

BRIEF DESCRIPTION OF THE DRAWINGS

While the novel features of the invention are set forth with particularity in the appended claims, the invention, as to organization and content, will be better understood and appreciated along with other objects and features thereof, from the following detailed description taken in conjunction with the drawings, in which:

DESCRIPTION OF THE PREFERRED EMBODIMENT

Figure 1:
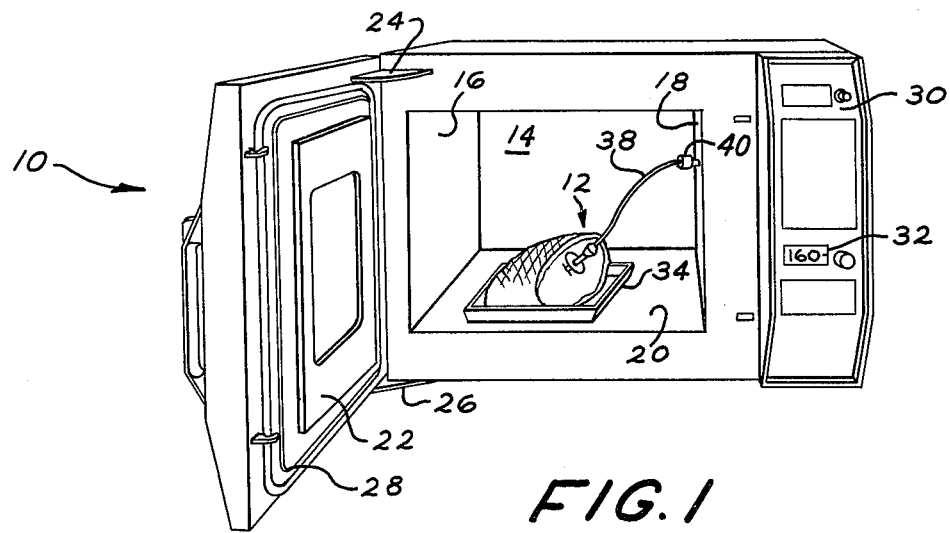
FIG. 1 is a front perspective view of a counter-top microwave oven shown with the oven door open and illustrating a portion of a food temperature-sensing probe assembly embodying the present invention.

Referring first to FIG. 1, there is illustrated a countertop microwave oven, generally designated by the numeral 10, including a food temperature-sensing probe assembly 12 constructed in accordance with and embodying features of the present invention. The oven 10 includes a cooking cavity generally designated at 14, defined by side walls 16 and 18, a top wall (not shown), a bottom 20, and a door 22. The door 22 is shown in its open position and is hingedly supported at the left side by hinges 24 and 26. The door 22 also includes a conventional microwave energy seal, shown generally at 28, to prevent the escape of microwave energy from the cooking cavity 14. The oven 10 further includes a control panel 30 which includes a temperature-setting control 32.

As is conventional, the oven 10 is also provided with a magnetron (not shown) for generating microwaves of a predetermined frequency, preferably at a nominal frequency of 2450 MHz. The oven 10 further includes a waveguide (not shown) for transmitting the microwave energy from the output of the magnetron to the interior of the cooking cavity 14.

Within the cooking cavity 14, there is shown a shallow container 34 constructed of a material transparent to microwaves, such as Pyrex dish, containing therein a piece of food 36, shown for purposes of illustration as a half of a ham. The ham 36 is to be cooked to an internal temperature of approximately 160° F. A portion of the probe assembly 12 is inserted into the ham 36 and is connected to control circuitry (not shown) contained within the oven 10 by means of a flexible shielded cable 38 and a connector 40 mounted on the oven side wall 18. Details of suitable circuitry which may be used in conjunction with the probe assembly 12 is disclosed in copending application Ser. No. 624,336, filed Oct. 21, 1975 by Richard E. Hornung, now U.S. Pat. No. 4,035,787, entitled "Food Temperature Responsive Control Apparatus," and assigned to the same assignee as the present invention. Preferably, the circuitry serves to turn off the magnetron and operate an audible indicator when the internal temperature of the ham 36 reaches the temperature set on the temperature-setting control 32.

Figure 2:
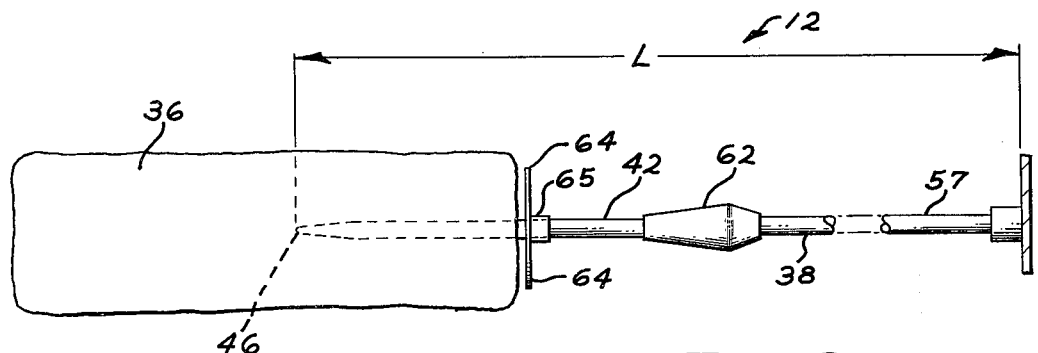
FIG. 2 is an enlarged side elevational view of the temperature-sensing probe and cable structure shown in FIG. 1.
Figure 3:
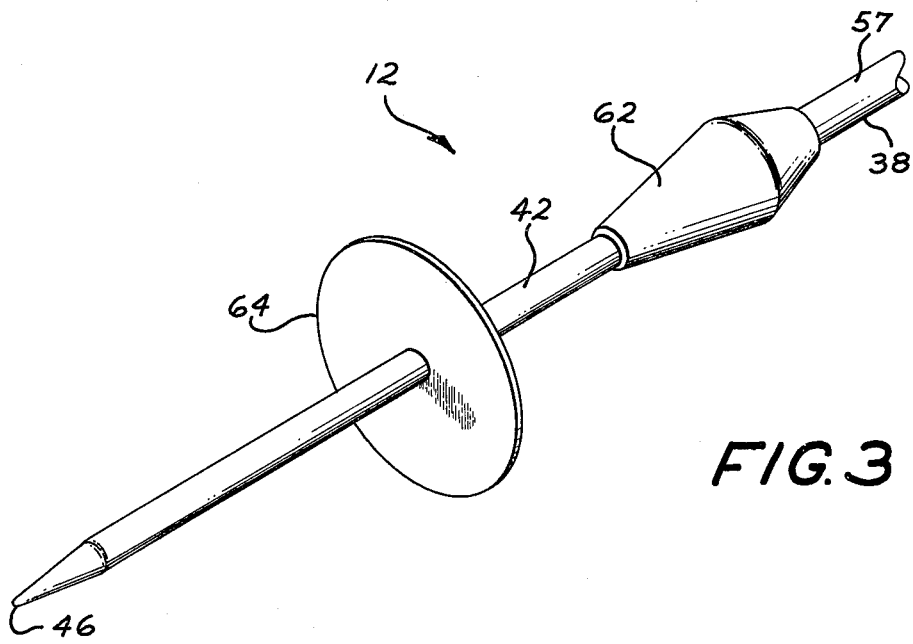
FIG. 3 is a perspective view of the probe assembly shown in FIG. 2, showing the disc-like configuration of the preferred embodiment of the reflector.
Figure 4:
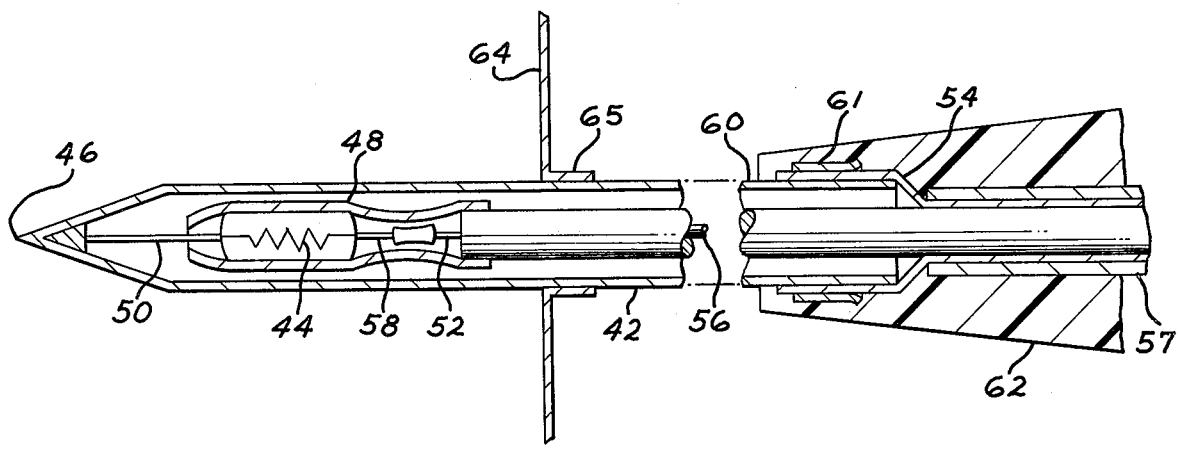
FIG. 4 is a further enlarged cross-sectional view of a portion of the probe illustrating a temperature-sensing element contained therein.

Referring now to FIGS. 2, 3, and 4, there are shown additional details of the probe assembly 12, which is only partially shown in FIG. 1. The probe assembly 12 includes a tubular electrically conductive housing 42 surrounding a temperature-sensing element such as a thermistor 44 located internally of the housing 42 near the distal end or tip 46 thereof. While a tubular probe housing having a circular cross section is shown, it will be apparent that other cross sections, such as square or hexagonal, may be employed without departing from the scope of the invention. The thermistor 44 is supported within a shrinkable insulating sleeve 48. One thermistor lead 50 is electrically and thermally connected to the probe housing 42 adjacent the tip 46. As is conventional, heat conduction to the thermistor 44 is primarily along the lead 50.

The flexible shielded cable 38 serves to electrically connect the thermistor 44 to the circuitry (not shown) and may be a coaxial cable, as illustrated, including an inner conductor 52, a braided cable shield 54, and an inner layer of dielectric insulation 56 separating the conductor 52 and the shield 54. An outer insulating layer 57 surrounds the shield 54. As is described in greater detail in the above-mentioned Chen and Fitzmayer, U.S. Pat. No. 3,975,720, alternative forms for the flexible shielded cable 38 are possible. Examples are a two-conductor shielded cable having two conductors and an outer shield, or, a flexible hollow tubular cable shield and a single inner conductor passing therethrough, but not necessarily centered axially.

The other thermistor lead 58 is electrically connected to the inner conductor 52 at one end of the cable 38. At the same end of the cable 38, the braided cable shield 54 is electrically connected to a connection end 60 of the probe housing 42 by fanning the braid slightly to increase its diameter and slipping the braid over the end 60 of the housing 42. A collar 61 is then crimped over the connection to securely hold the shield 54 to the housing 42. The probe housing 42 and the cable shield 54 thereby cooperate to form a continuous conductive sheath from the tip 46 of the probe housing 42 to the other end of the cable 38. At the other end of the cable 38, the cable shield 54 is electrically connected through the connector 40 to the side wall 18. It will be apparent that the shielding effect of the continuous conductive sheath is present along the entire length thereof. The primary difference between the portion of the continuous conductive sheath which is formed by the probe housing 42 and the portion which is formed by the cable shield 54 is relative flexibility; the probe housing 42 is rigid and the cable shield 54 is flexible. Electrically, the two are equivalent. The probe assembly 12 is also provided with a handle 62 which preferably is made of an insulating material.

For a temperature-sensing probe assembly which is to be used in a microwave oven, it is preferable to make the total effective electrical length of the probe and the cable, measured along the cable 38 and the probe housing 42 from the cooking cavity wall 18 to the distal end or tip 46, approximately equal to $n\lambda/2$, where $n$ is any integer and $\lambda$ is the wavelength of the microwave energy being used to cook the food, as is taught by the above-mentioned Chen and Fitzmayer Pat. No. 3,975,720. As is more fully explained in the Chen and Fitzmayer patent, when the total effective electrical length is so selected, heating of the probe housing 42 and cable 38 by direct action of the microwave energy is minimized. Therefore, for best results, the length should be so selected. It is believed, however, that substantial benefits of the present invention may still be obtained when the total effective electrical length of the probe and cable is other than that which is taught in the Chen and Fitzmayer patent.

In accordance with the present invention, the probe assembly 12 additionally includes a reflector 64 mounted on the continuous conductive sheath formed by the probe housing 42 and the cable shield 54, preferably along the portion formed by the rigid probe housing 42. The reflector 64 is made of electrically conductive material and preferably is in the form of a disc, as shown. A slightly resilient flange 65 (FIGS. 2 and 4) on the reflector 64 serves to hold the reflector 64 on the housing 42 in a plane normal to the longitudinal axis of the housing 42, to permit sliding movement of the reflector 64 along the housing 42, and to insure good electrical contact between the two to minimize arcing.

The reflector 64, being slidable along the probe housing 42, is adapted to be spaced varying distances from the food 36. The shielding effect produced by the reflector 64 varies both with reflector size and reflector-to-food spacing. The shielding effect increases with increased reflector size and with decreased reflector-to-food spacing. A minimum effective reflector diameter has been found to be one inch, but for best results the diameter should be at least 1.25 inches. A practical reflector diameter has been found to be 1.6 inches. When the reflector-to-food spacing is too small, for example, less than $\frac{1}{8}$ inch for a 1.6 inch diameter reflector, then the shielding effect is too complete and the region of the food 36 surrounding the probe housing 42 will not be sufficiently cooked. Conversely, when the reflector-to-food spacing is too large, for example, greater than $2\frac{1}{2}$ inches for a 1.6 inch diameter reflector, then there is insufficient shielding and excessive "feed in" will occur.

In the embodiment illustrated in FIGS. 2, 3, and 4, reflector 64 is slidably mounted on the probe housing 42 so that the position of the reflector 64 along the probe housing 42, and thus the reflector-to-food spacing, can be adjusted to achieve a condition in which an optimum amount of microwave energy enters the food 36 in the region immediately adjacent the probe housing 42. The reflector 64 may either be electrically insulated from the probe housing 42 or electrically connected to the housing 42. It is preferable, however, to electrically connect the reflector 64 and the housing 42 to eliminate problems caused by arcing which may develop if the two are not forced to assume the same electrical potential at their interface. For convenience, and in order to achieve the most uniform shielding effect, the illustrated reflector 64 is circular. It will be apparent to those skilled in the art that other shapes may be used for the reflector 64 without departing from the scope of the invention.

Figure 5:
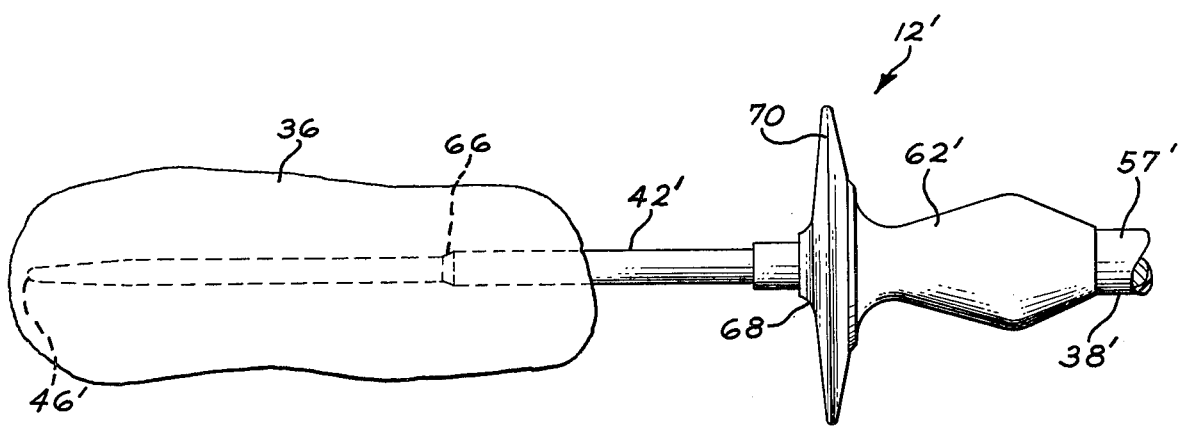
FIG. 5 is a side elevational view of an alternative form of a temperature-sensing probe embodying features of the present invention.

Referring now to FIG. 5, there is illustrated an alternative embodiment of the present invention. The specific embodiment illustrated in FIG. 5 forms no part of the present invention, but, rather, includes additional features which are included in the subject matter of copending application Ser. No. 643,109, filed Dec. 22, 1975, concurrently herewith by Richard E. Hornung, now U.S. Pat. No. 3,991,615, issued Nov. 16, 1976, entitled "Microwave Oven Food Temperature-Sensing Probe Assembly" and of copending application Ser. No. 643,110, filed Dec. 22, 1975, concurrently herewith by Louis H. Fitzmayer and Richard E. Hornung, now U.S. Pat. No. 3,988,930, issued Nov. 2, 1976, also entitled "Microwave Oven Food Temperature-Sensing Probe Assembly," both applications assigned to the same assignee as the present invention. In the embodiment of the invention illustrated in FIG. 5, the elements which are substantially unchanged from the previously described embodiment are designated by primed reference numerals, and a detailed description thereof will not be repeated. In FIG. 5, the reflector 64' and the insulating handle 62' are firmly attached together so as to fixedly mount the reflector 64' to the probe housing 42. The probe housing 42 includes an indicator 66 to indicate the minimum depth to which the probe housing 42' should be inserted into the food 36 for best results. Additionally, the probe 12 includes a spacer 68 positioned on the reflector side 70 facing the food 36 to control the maximum insertion depth of the probe housing 42 into the food 36. The indicator 66 and the spacer 68 cooperate to define a range of recommended insertion depths. Further details of the fixed poition reflector 64', of the minimum insertion depth indicator 66, and of the spacer 68 are described in the above-mentioned Hornung U.S. Pat. No. 3,991,615, and the Fitzmayer and Hornung U.S. Pat. No. 3,988,930.

Having described preferred embodiments of the invention, the operation thereof will now be described. The theory of operation, hereinafter described, is that which is at present believed properly applicable to the invention, but it is not intended to be binding. Considering first the operation of the embodiment illustrated in FIGS. 2, 3, and 4, in preparation for cooking, the probe housing 42 is inserted into the food 36 so that the tip 46 of the probe assembly 12 is approximately in the center of the food 36. During cooking, the internal temperature of the food 36 near the tip 46 is sensed by the thermistor 44. The thermistor 44 is connected to the circuitry through the cable 38 and the circuitry produces a control effect, such as turning off the oven and operating an audible alarm, when the preset temperature is reached. The reflector 64 of the present invention is adjusted along the probe housing 42 to a position close to, but spaced slightly from, the food 36. The reflector 64 should be spaced at least $\frac{1}{8}$ inch from the food 36. When the reflector diameter is selected, as discussed above, to have a diameter of between 1.25 and 1.6 inches, the precise spacing of the reflector 64 from the food 36 is not particularly critical as substantial benefits of the invention may be obtained over wide ranges. In use, a variation in the amount of "feed in" will be apparent, depending upon the precise reflector-to-food spacing. For example, in FIG. 2, if the reflector 64 is moved as far away from the food as possible, all the way against the handle 62, then the shielding effect of the reflector 64 is minimal and substantial "feed in" and resulting overcooking of the food in the region immediately adjacent the probe housing 42 can result. Conversely, if the reflector 64 is pushed all the way up against the food 36, the shielding provided is overly effective and the food in the region of the food immediately adjacent the probe housing 42 is underdone.

It is believed that, without the reflector 64, microwave energy is picked up by the cable 38 and the probe housing 42 and follows along the cable 38 and probe housing 42 to be directed and concentrated into the food 36 in the region immediately adjacent the probe housing 42. The reflector 64 serves to reflect a controlled amount of the microwave energy back up the cable 38 toward the connector 40, thereby preventing excessive microwave energy from reaching the food 36.

In the operation of the embodiment shown in FIG. 5, the probe housing 42' is inserted into the food 36 to a position such that the tip 46' is near the center of the food 36 and the outer boundary of the food 36 is between the minimum insertion depth indicator 66 and the maximum insertion depth indicator or spacer 68. When insertion depth is within the indicated range, satisfactory results are obtained. The embodiment of FIG. 5 is considered to be more convenient to use than the embodiment shown in FIG. 2. As mentioned above, this alternative form of the probe assembly 12' shown in FIG. 5 forms no part of the subject matter of the present invention but includes features which are the subject matter of U.S. Pat. Nos. 3,991,615 and 3,988,930.

While specific embodiments of the invention have been illustrated and described herein, it is realized that modifications and changes will occur to those skilled in the art. It is therefore to be understood that the appended claims are intended to cover all such modifications and changes as fall within the true spirit and scope of the invention.

What is claimed is:

1. A temperature-sensing probe assembly for monitoring the internal temperature of food being cooked in the cooking cavity of a microwave oven, said probe assembly comprising:
   a. a probe adapted for insertion into food to be cooked, said probe including an elongated conductive housing, the tip end of which is closed and shaped to facilitate insertion into the food, and said probe further including a temperature sensing electrical element positioned internally of the housing near the tip end;
   b. a flexible shielded cable for connecting said electrical element to circuitry responsive to thermally induced changes in a characteristic of said electrical element, the cable shield being electrically connected at one end to the connection end of said probe housing and adapted at the other end for connection to a wall of the cooking cavity, said probe housing and the cable shield thereby cooperating to form a continuous conductive sheath from the tip of said probe housing to the other end of said cable; and
   c. an electrically conductive microwave energy reflector mounted on said continuous conductive sheath adjacent to, but spaced from, the food to reduce the amount of microwave energy which enters the food in the region immediately adjacent said probe housing.

2. A probe assembly according to claim 1, wherein said reflector is generally disc-shaped and has a diameter of at least 1.0 inch.

3. A probe assembly according to claim 2, wherein said reflector is mounted on said sheath along the probe housing portion thereof.

4. A probe assembly according to claim 3, wherein said reflector is slidably mounted on said probe housing, whereby the position of said reflector along said housing can be adjusted to achieve a condition in which a desirable amount of microwave energy enters the food in the region immediately adjacent said probe housing.

5. A probe assembly according to claim 2, wherein said reflector has a diameter of between approximately 1.25 and 1.65 inches.

6. A probe assembly according to claim 5, wherein the reflector-to-food spacing may be varied from approximately ⅛ inch to 2½ inches.

7. A probe assembly according to claim 1, wherein said reflector and said housing are electrically connected.

8. A probe assembly according to claim 1, wherein the total effective length of said probe and said cable, measured along the cable and probe from the other end of said cable to the tip of said probe, is approximately equal to $n \lambda/2$, where $n$ is an integer and $\lambda$ is the wavelength of the microwave energy.

* * * * *